United States Patent
DeRosa et al.

(10) Patent No.: US 9,341,536 B2
(45) Date of Patent: May 17, 2016

(54) PRESSURE SENSOR HAVING A FRONT SEAL

(71) Applicant: Kulite Semiconductor Products, Inc., Leonia, NJ (US)

(72) Inventors: Louis DeRosa, Wayne, NJ (US); Robert Gardner, Westwood, NJ (US); Joseph R. VanDeWeert, Maywood, NJ (US); Adam Hurst, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 145 days.

(21) Appl. No.: 14/187,373

(22) Filed: Feb. 24, 2014

(65) Prior Publication Data

US 2015/0241293 A1    Aug. 27, 2015

(51) Int. Cl.
*G01L 9/06* (2006.01)
*G01L 19/14* (2006.01)

(52) U.S. Cl.
CPC .. *G01L 19/14* (2013.01); *G01L 9/06* (2013.01)

(58) Field of Classification Search
CPC ....... G01L 9/0054; G01L 7/00; G01L 9/0002; G01L 9/0057; G01L 19/147; G01L 9/0042
USPC ........... 73/727, 715, 700, 726, 725, 723, 753, 73/754; 257/419; 338/42, 4
See application file for complete search history.

(56) References Cited

U.S. PATENT DOCUMENTS

| | | | | |
|---|---|---|---|---|
| 5,955,771 A * | 9/1999 | Kurtz | ................... | G01L 19/0084 257/419 |
| 5,973,590 A * | 10/1999 | Kurtz | ................... | G01L 19/0084 338/36 |
| 7,702,478 B2 * | 4/2010 | Hedtke | ............... | G05B 23/0208 702/100 |
| 7,775,117 B2 * | 8/2010 | Kurtz | ................... | G01L 19/0038 73/721 |
| 8,482,372 B2 * | 7/2013 | Kurtz | .................... | C03C 27/044 338/13 |
| 8,516,897 B1 * | 8/2013 | Jones | ..................... | G01L 19/147 257/414 |
| 2010/0018494 A1 * | 1/2010 | Obermeier | ............ | G01L 9/0042 123/198 R |
| 2010/0257937 A1 * | 10/2010 | Kurtz | .................. | G01L 19/0084 73/721 |
| 2010/0275696 A1 * | 11/2010 | Kurtz | .................... | G01L 9/0051 73/715 |
| 2010/0326199 A1 * | 12/2010 | Kurtz | .................... | G01L 13/025 73/721 |
| 2011/0296927 A1 * | 12/2011 | Hopman | ................ | G01L 9/0075 73/723 |
| 2012/0060619 A1 * | 3/2012 | Gardner | .............. | G01L 19/0007 73/727 |
| 2013/0042694 A1 * | 2/2013 | Ned | ....................... | G01L 9/0048 73/727 |
| 2014/0048936 A1 * | 2/2014 | Ned | ......................... | H01L 24/48 257/750 |

* cited by examiner

*Primary Examiner* — Lisa Caputo
*Assistant Examiner* — Nigel Plumb
(74) *Attorney, Agent, or Firm* — Troutman Sanders LLP; James E. Schutz; Mark Lehi Jones

(57) ABSTRACT

This disclosure provides example methods, devices, and systems for a sensor having a front seal. In one embodiment, a system may comprise a sensing element; a header coupled to the sensing element; a housing coupled to the header; an adaptor coupled to the housing, wherein a first gap separates the adapter and the sensing element and a second gap separates the adapter and the header; and wherein a stress applied at a front surface of the adapter is transferred to the housing, and the first gap is used to isolate the sensing element from the stress and the second gap is used to isolate the header from the stress.

21 Claims, 4 Drawing Sheets

PRESSURE SENSOR HAVING A FRONT SEAL

FIELD OF THE INVENTION

This invention relates to sensors and more particularly to a pressure sensor having a front seal.

BACKGROUND OF THE INVENTION

Pressure sensors are widely employed in many environments in order to monitor pressure. For instance, pressure sensors may operate in harsh environments such as monitoring pressure in internal combustion engines or aircraft engines, as well as in other environments subjected to high pressures or high temperatures. In a typical pressure sensor, a pressure sensing element may be packaged in a round, glass-metal seal header. This header may be welded onto a screw housing. The screw housing may be mounted to a mating surface such as associated with a port of an engine, forming a seal between the screw housing and the mating surface. Since the seal is formed by the screw housing and the mating surface, any stress caused by the seal may not be transferred to the header. This configuration may work well for many applications but may not work well for applications requiring a seal associated with the front of a sensor. The use of a sensor having a front seal is common in combustion measurements requiring a reduced volume. For a typical sensor having a front seal, the seal may be formed, for instance, directly between the header surface and the surface of the engine or on an adaptor welded to the housing, which may be in close proximity to the header. However, the front seal may place undue stress on the header, which may cause this stress to be transferred to the sensing element.

FIG. 1 shows a prior art sensor 100 having a front seal. A glass seal header 101 is coupled to a sensing element 102. For many applications, this may be done using a piezoresistive leadless sensor. These sensors are made of silicon and have been widely employed. In one example of such sensor, reference is made to U.S. Pat. No. 5,955,771, entitled "SENSORS FOR USE IN HIGH-VIBRATIONAL APPLICATIONS AND METHODS FOR FABRICATING THE SAME" issued on Sep. 21, 1999 to A. D. Kurtz, et al. and assigned to Kulite Semiconductor Products Inc, the assignee herein. In another example, reference is made to U.S. Pat. No. 5,973,590, entitled "ULTRA THIN SURFACE MOUNT WAFER SENSOR STRUCTURES AND METHODS FOR FABRICATING THE SAME" issued on Oct. 26, 1999 to A. D. Kurtz, et al. and assigned to Kulite Semiconductor Products Inc, the assignee herein. Each of these patents is incorporated herein in their entirety. This configuration allows use of the front seal sensor 100 in high temperature, high vibration environments. The glass seal header 101 is welded to a screw housing 103, which allows the front seal sensor 100 to be threaded into a port of, for instance, an engine. The glass seal header 101 encloses the sensing element 102. Further, a first adaptor 104 is welded or press fit to the screw housing 103. A second adapter 105 is welded to the first adaptor 104. The second adaptor 105 has a front surface 106, which allows for sealing the front seal sensor 100 against a mating surface during installation. Since this is a metal-to-metal seal, a large amount of stress is generated in forming the seal. This stress is transferred to the sensing element 102, which may result in reduced accuracy of measurements made by the sensing element 102. Accordingly, there is a need for techniques to allow for reducing an amount of stress transferred to a sensing element of a sensor having a front seal. Further, there is a need for techniques to improve pressure sensors having a Helmholtz resonator. In addition, other desirable features and characteristics of the present disclosure will become apparent from the subsequent detailed description and claims, taken in conjunction with the accompanying figures and the foregoing technical field and background.

SUMMARY OF THE INVENTION

Briefly described, embodiments of the present disclosure relate to a sensor having a front seal. Furthermore, embodiments of the present disclosure relate to a sensor having a Helmholtz resonator. In one example embodiment, a system may include a sensing element, a header, a housing and an adaptor. The header may be coupled to the sensing element and the housing may be coupled to the header. Also, the adaptor may be coupled to the housing. A first gap may separate the adapter and the sensing element. Also, a second gap may separate the adapter and the header. A stress applied to the adapter may be transferred to the housing. The first gap may be used to isolate the sensing element from the stress. Further, the second gap may be used to isolate the header from the stress.

In another example embodiment, a system may include a sensing element, a header, a housing, an adaptor and a screen. The header may be coupled to the sensing element and the housing may be coupled to the header. Also, the adaptor may be coupled to the housing. Further, the screen may be disposed in an opening of the housing. A first cavity may be disposed between the screen and the sensing element. A second cavity may be disposed between the adaptor and the sensing element. The screen in combination with the first cavity and the second cavity may form a Helmholtz resonator.

In another example embodiment, a system may include a sensing element, a header, a housing, an adaptor and a screen. The header may be coupled to the sensing element and the housing may be coupled to the header. Also, the adaptor may be coupled to the housing. Further, the screen may be disposed in an opening of the housing. A first cavity may be disposed between the screen and the sensing element. A second cavity may be disposed between the adaptor and the sensing element. Further, a third cavity may be disposed between the adaptor and the heading. The screen in combination with the first cavity, the second cavity and the third cavity may form a Helmholtz resonator.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF THE INVENTION

Figure 1:
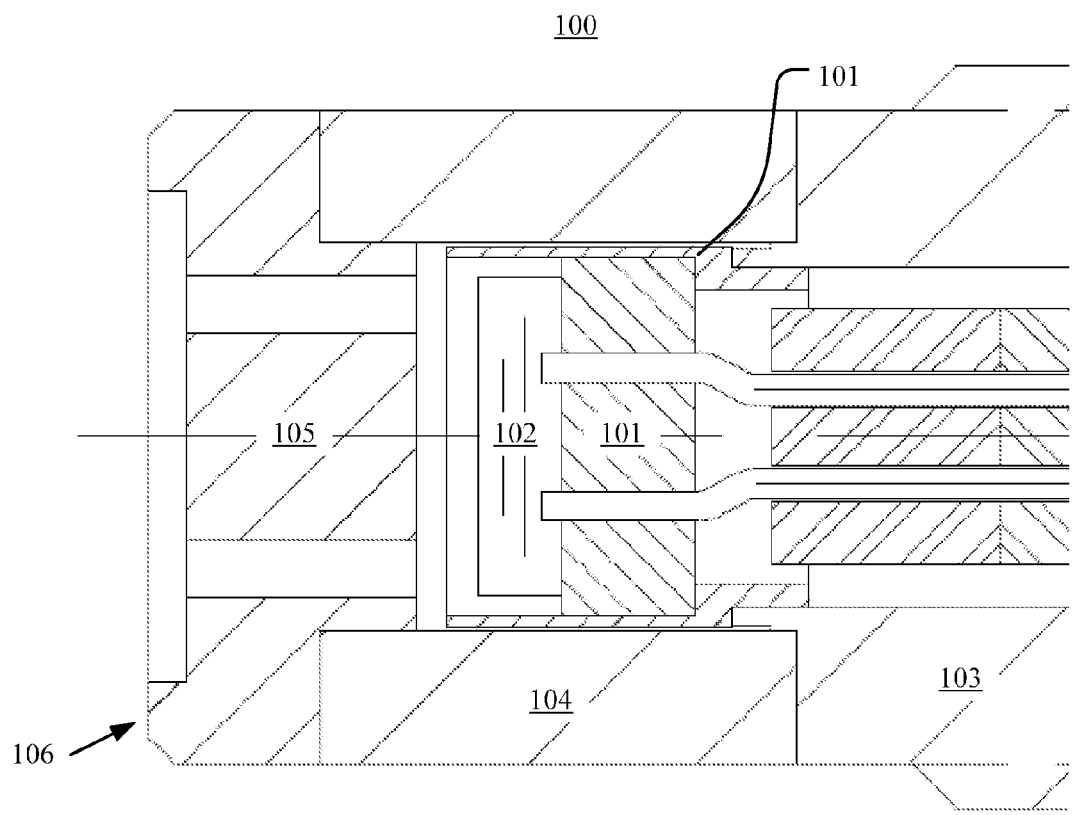
FIG. 1 is a prior art sensor having a front seal.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a sensor having a front seal and a sensor having a Helmholtz resonator. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 2:
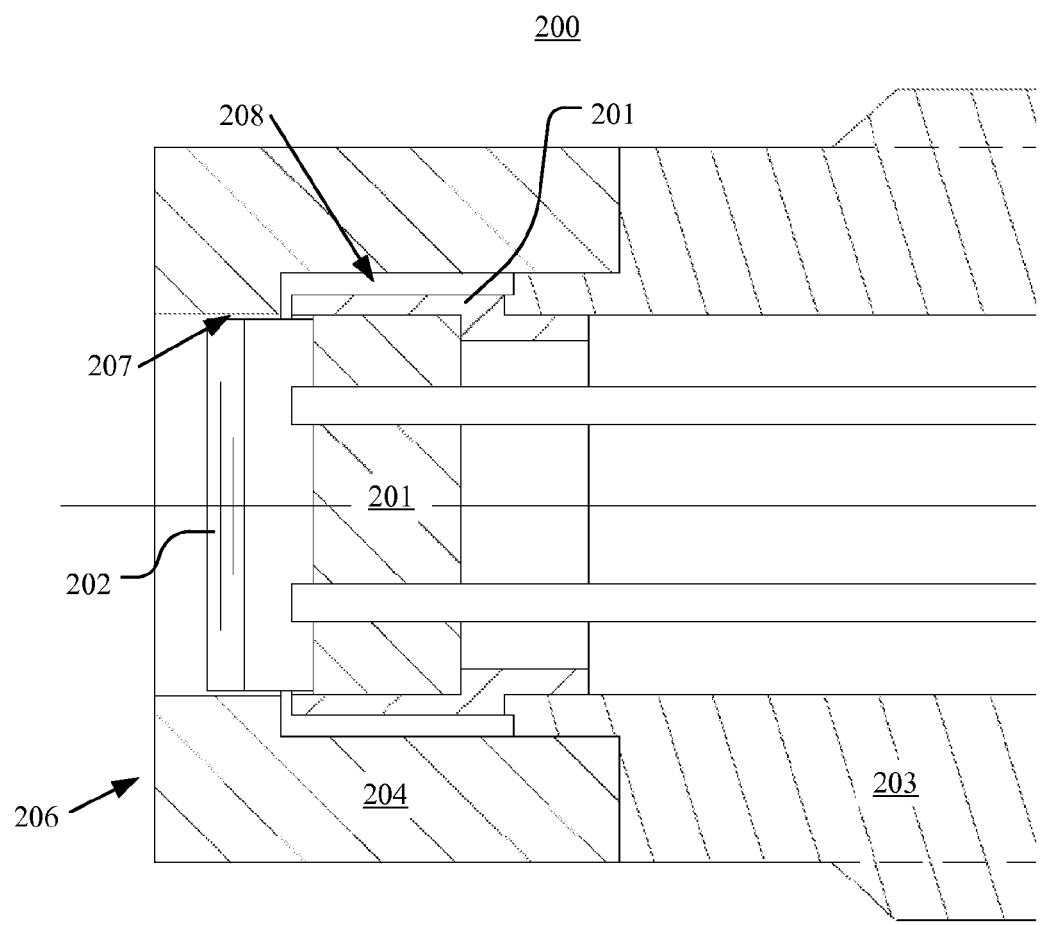
FIG. 2 is a partial longitudinal cross-sectional view of one embodiment of a sensor having a front seal with various aspects set forth herein.

This disclosure presents a sensor having a front seal. For example, FIG. 2 is a partial longitudinal cross-sectional view of one embodiment of a sensor 200 having a front seal with various aspects set forth herein. In FIG. 2, the sensor 200 may be configured to include a header 201, a sensing element 202, a housing 203, and an adapter 204. The header 201 may be coupled to the housing 203. For example, the header 201 may be secured, bonded, welded, press fit or the like to the housing 203. The header 201 may be composed of glass, metal, ceramic material, or the like. In one example, the header 201 may be composed of glass. The housing 203 may be composed of metal, ceramic material, or the like. In one example, the housing 203 may be composed of metal. The header 201 may be coupled to the sensing element 202. For example, the header 201 may be secured, bonded, welded, press fit or the like to the sensing element 202. The sensing element 202 may be capable of measuring an environmental condition such as pressure, temperature, humidity, or the like. In one example, the sensing element 202 may be a piezoresistive leadless sensor. In another example, the sensing element 202 may be a piezoresistive sensing network such as a Wheatstone bridge. The header 201 may not enclose the sensing element 202. Instead, the header 201 may be coupled to a back-side of the sensing element 202, leaving a front-side of the sensing element 202 protruding away from the header 201 towards a front of the sensor 200.

In FIG. 2, the adaptor 204 may be coupled to the housing 203 so that a first gap 207 may be disposed between the adaptor 204 and the sensing element 202 and a second gap 208 may be disposed between the adaptor 204 and the header 201. For example, the adaptor 204 may be secured, bonded, welded, press fit or the like to the housing 203. The adaptor 204 may be composed of metal, ceramic material, or the like. In one example, the adaptor 204 may be composed of metal. The first gap 207 may keep the adaptor 204 from connecting or making contact with the sensing element 202. Further, the first gap 207 may form a first cavity around the sides of the sensing element 202. In one example, the first gap 207 may be less than 0.015 inches. In another example, the first gap 207 may be in the range of 0.001 inches to 0.015 inches. Similarly, the second gap 208 may keep the adaptor 204 from connecting or making contact with the header 201. Further, the second gap 208 may form a second cavity around the sides of the header 201. In one example, the second gap 208 may be less than 0.040 inches. In another example, the second gap 208 may be in the range of 0.005 inches to 0.040 inches.

In this embodiment, the adaptor 204 may have a front surface 206, which may be used to form a front seal between the sensor 200 and a mating surface such as an engine surface. Since the front seal may be a metal-to-metal seal, a stress may be generated in forming the front seal. The first gap 207 and the second gap 208 may be used to reduce all or a portion of the stress that is transferred from the adaptor 204 to the sensing element 202 or the header 201. Thus, the stress may be transferred through the adapter 204 to the housing 203 instead of being transferred through the adapter 204 to the header 201 or the sensing element 202. In one example, the stress may be transferred through the adapter 204 to an outside of the housing 203 such as a screw housing and down into a securing mechanism of the housing 203 such as threads of the screw housing.

Furthermore, the first gap 207 may allow a fluid such as a gas or a liquid to be disposed between the adaptor 204 and the sensing element 201, which may cause wear, corrosion, heat transfer or the like on the sensing element 201 or the adaptor 204. Similarly, the second gap 208 may also allow a fluid to be disposed between the adaptor 204 and the header 202, which may also cause wear, corrosion, heat transfer or the like on the header 202, the adaptor 204 or the housing 203.

Figure 3:
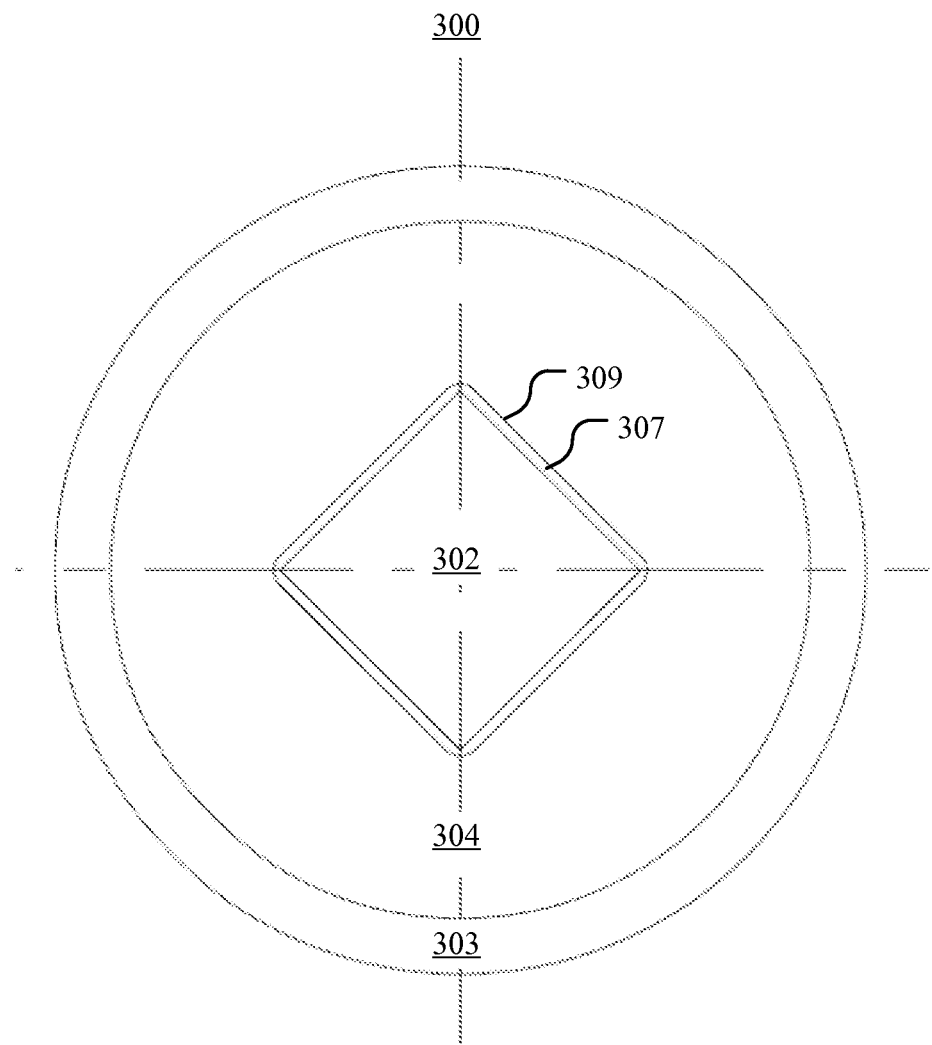
FIG. 3 is a top view of another embodiment of a sensor having a front seal with various aspects set forth herein.

Any impact of a fluid on an adaptor, a header, a sensing element or a housing may be reduced or eliminated. For example, FIG. 3 is a top view of another embodiment of a sensor 300 having a front seal with various aspects set forth herein. In FIG. 3, the sensor 300 may be configured to include a header (not shown), a sensing element 302, a housing 303 and an adapter 304. The adapter 304 may define an opening 309 of the sensor 200. In one example, a shape of the opening 309 may be about square, circular, rectangular, oval, polygonal, or the like. The sensing element 302 may be disposed within the opening 309. A first gap 307 may be disposed between outer walls of the sensing element 302 and inner walls of the adapter 304. Further, the first gap 307 may form a first cavity around the sides of the sensing element 301. To reduce a volume of fluid that may enter, exit, or be disposed in the first gap 307, a shape or a size of the opening 309 may be about equivalent to a shape or a size of the sensing element 302. In one example, the shape of the opening 309 may be about equivalent to the shape of the sensing element 302. In another example, the size of the opening 309 may be about equivalent to the size of the sensing element 302. In another example, the shape and the size of the opening 309 may be about equivalent to the shape and the size of the sensing element 302. The impact of a fluid disposed in the first gap 307 on the adapter 304, the header, the sensing element 302, or the housing 303 may be reduced or eliminated by limiting a volume of the fluid that may enter, exit, or be disposed in the first gap 307, which may also improve a flat frequency response of the sensing element 302 since a smaller volume cavity around the sensing element 302 may reduce, for instance, Helmholtz-related acoustic resonance.

Figure 4:
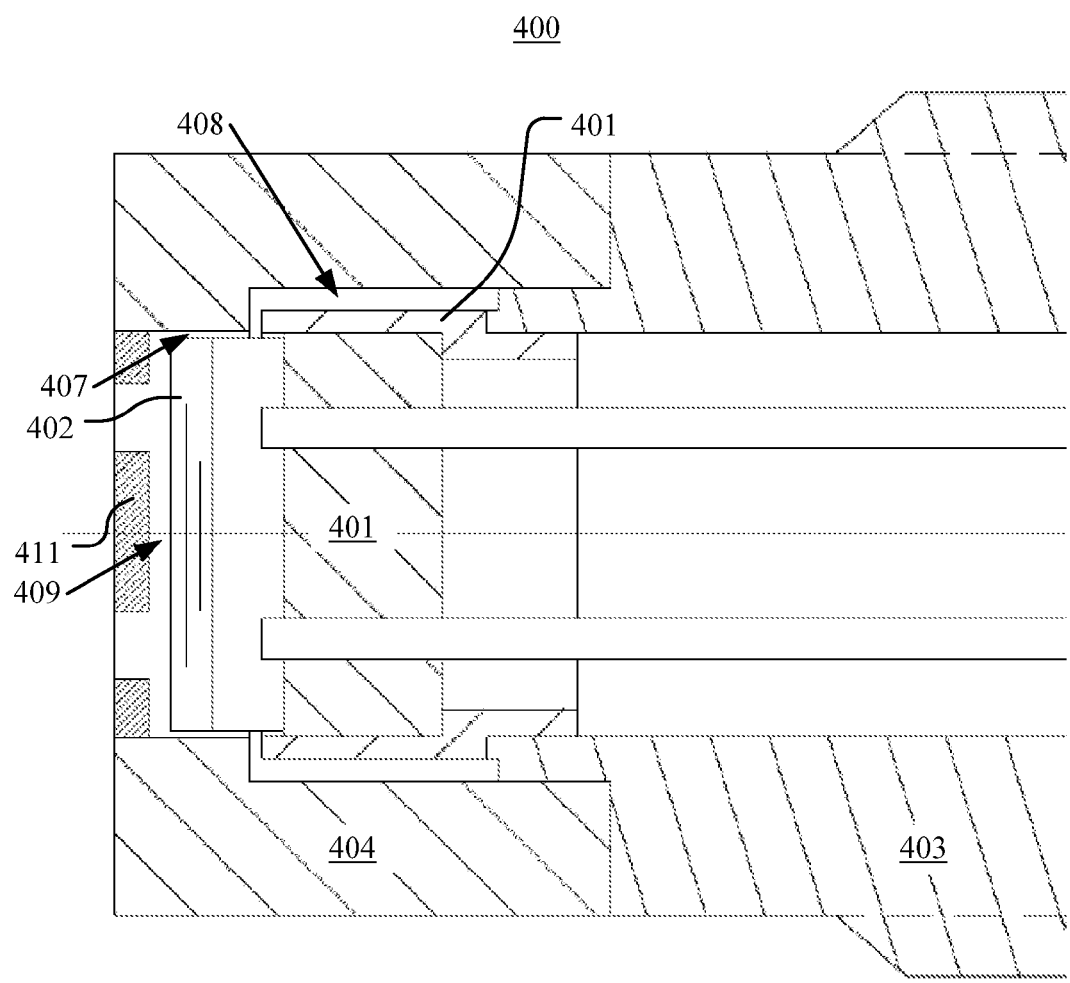
FIG. 4 is a partial longitudinal cross-sectional view of another embodiment of a sensor having a front seal and a Helmholtz resonator with various aspects set forth herein.

This disclosure also presents a sensor having a front seal and a Helmholtz resonator. FIG. 4 is a partial longitudinal cross-sectional view of another embodiment of a sensor 400 having a front seal and a Helmholtz resonator with various aspects set forth herein. In FIG. 4, the sensor 400 may be configured to include a header 401, a sensing element 402, a housing 403, an adapter 404, and a screen 411. The header 401 may be coupled to the housing 403. For example, the header 401 may be secured, bonded, welded, press fit or the like to the housing 403. The header 401 may be composed of glass, metal, ceramic material, or the like. In one example, the header 401 may be composed of a ceramic material. The housing 403 may be composed of metal, ceramic material, or the like. In one example, the housing 403 may be composed of ceramic material. The header 401 may be coupled to the sensing element 402. For example, the header 401 may be secured, bonded, welded, press fit or the like to the sensing element 402. The sensing element 402 may be capable of measuring an environmental condition such as pressure, temperature, humidity, or the like. In one example, the sensing element 402 may be used to measure a pressure and a temperature. The header 401 may not enclose the sensing element 402. Instead, the header 401 may be coupled to a back-side of the sensing element 402, leaving a front-side of the sensing element 402 protruding away from the header 401 towards a front of the sensor 400.

In FIG. 4, the adaptor 404 may be coupled to the housing 403 so that a first gap 407 may be disposed between the adaptor 404 and the sensing element 402 and a second gap 408 may be disposed between the adaptor 404 and the header 401. In one example, the adaptor 404 may be secured, bonded, welded, press fit or the like to the housing 403. The adaptor 404 may be composed of metal, ceramic material, or the like. In one example, the adaptor 404 may be composed of a ceramic material. The first gap 407 may keep the adaptor 404 from connecting or making contact with the sensing element 402. Further, the first gap 407 may form a first cavity around the sides of the sensing element 402. Similarly, the second gap 408 may keep the adaptor 404 from connecting or making contact with the header 401. Further, the second gap 408 may form a second cavity around the sides of the header 401.

In this embodiment, the screen 411 may be disposed in front of the sensing element 401 defining a third cavity 409.

The screen 411 may be composed of metal, ceramic material, or the like. In one example, the screen 411 may be composed of metal. In a typical sensor having a screen disposed in front of a sensing element defining a cavity, the screen in combination with the cavity forms a Helmholtz resonator that may slow a response time of the sensing element. However, the screen 409 in combination with the first cavity associated with the first gap 407, the second cavity associated with the second gap 408 and the third cavity 409 may form a Helmholtz resonator that may not slow a response time of the sensing element 402. In one example, the response time of the sensing element 402 may be less than fifty microseconds (50 μsec.).

In another embodiment, a system may be configured to include a sensing element; a header coupled to the sensing element; and a housing coupled to the header. Further, the system may be configured to include an adaptor coupled to the housing. A first gap may separate the adapter and the sensing element. Also, a second gap may separate the adapter and the header. A stress applied at a front surface of the adapter may be transferred to the housing. Further, the first gap may be used to isolate the sensing element from the stress. The second gap may be used to isolate the header from the stress.

In another embodiment, the adaptor may not be connected to the sensing element.

In another embodiment, the adaptor may not be in contact with the sensing element.

In another embodiment, the first gap may be less than 0.015 inches.

In another embodiment, the first gap may be in the range of 0.001 inches to 0.015 inches.

In another embodiment, the adaptor may not be connected to the header.

In another embodiment, the header may not be in contact with the adaptor.

In another embodiment, the second gap may be less than 0.040 inches.

In another embodiment, the second gap may be in the range of 0.005 inches to 0.040 inches.

In another embodiment, the sensing element may be a piezoresistive leadless sensor.

In another embodiment, the sensing element may be used to measure an environmental condition.

In another embodiment, the environmental condition may be pressure.

In another embodiment, the adapter may be disposed around and may define an opening.

In another embodiment, the sensing element may be disposed in the opening.

In another embodiment, a shape of the opening may be about equivalent to a shape of the sensing element.

In another embodiment, the shape of the opening may be square.

In another embodiment, a size of the opening may be about equivalent to a size of the sensing element.

In another embodiment, the system may be further configured to include a screen disposed in the opening of the adapter. A first cavity may be disposed between the screen and the sensing element. Further, a second cavity may be associated with the first gap. The screen in combination with the first cavity and the second cavity may form a Helmholtz resonator.

In another embodiment, the Helmholtz resonator may not reduce a response time of the sensing element.

In another embodiment, a third cavity may be associated with the second gap.

In another embodiment, the screen in combination with the first cavity, the second cavity and the third cavity may form a Helmholtz resonator.

In another embodiment, a response time of the sensing element may be less than about fifty microseconds.

In another embodiment, the front surface of the adapter may be coupled to a mating surface.

In another embodiment, a system may be configured to include a sensing element; a header coupled to the sensing element; a housing coupled to the header; and an adaptor coupled to the housing. A screen may be disposed in an opening of the housing. A first cavity may be disposed between the screen and the sensing element. Further, a second cavity may be disposed between the adaptor and the sensing element. The screen in combination with the first cavity and the second cavity may form a Helmholtz resonator.

In another embodiment, a first gap between the adapter and the sensing element may be less than 0.015 inches.

In another embodiment, a first gap between the adapter and the sensing element may be in the range of 0.001 inches to 0.015 inches.

In another embodiment, the adaptor may not be connected to the header.

In another embodiment, a second gap between the adapter and the header may be less than 0.040 inches.

In another embodiment, a second gap between the adapter and the header may be in the range of 0.005 inches to 0.040 inches.

In another embodiment, the sensing element may be a piezoresistive leadless sensor.

In another embodiment, the sensing element may be used to measure an environmental condition.

In another embodiment, the environmental condition may be pressure.

In another embodiment, the adapter may be disposed around and may define an opening.

In another embodiment, the sensing element may be disposed in the opening.

In another embodiment, a shape of the opening may be about equivalent to a shape of the sensing element.

In another embodiment, the shape of the opening may be square.

In another embodiment, a size of the opening may be about equivalent to a size of the sensing element.

In another embodiment, the Helmhotz resonator may not reduce a response time of the sensing element.

In another embodiment, a response time of the sensing element may be less than about fifty microseconds.

In another embodiment, the front surface of the adapter may be coupled to a mating surface.

In another embodiment, a stress applied at a front surface of the adapter may be transferred to the housing.

In another embodiment, the second cavity may isolate the sensing element from a stress applied at a front surface of the adapter.

In another embodiment, a third cavity may be disposed between the adaptor and the header.

In another embodiment, the screen in combination with the first cavity, the second cavity and the third cavity may form a Helmholtz resonator.

In another embodiment, the third cavity may isolate the header from a stress applied at a front surface of the adapter.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned sensor having a front seal and the aforementioned sensor having a Helmholtz resonator, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A system, comprising:
    a sensing element;
    a header coupled to the sensing element;
    a housing coupled to the header;
    an adaptor coupled to the housing, wherein a first gap separates the adapter and the sensing element and a second gap separates the adapter and the header; and
    wherein a stress applied at a front surface of the adapter is transferred to the housing, and the first gap is used to isolate the sensing element from the stress and the second gap is used to isolate the header from the stress.

2. The system of claim 1, wherein the adaptor is not connected to the sensing element.

3. The system of claim 1, wherein the adaptor is not in contact with the sensing element.

4. The system of claim 1, wherein the first gap is less than 0.015 inches.

5. The system of claim 1, wherein the first gap is in the range of 0.001 inches to 0.015 inches.

6. The system of claim 1, wherein the adaptor is not connected to the header.

7. The system of claim 1, wherein the header is not in contact with the adaptor.

8. The system of claim 1, wherein the second gap is less than 0.040 inches.

9. The system of claim 1, wherein the second gap is in the range of 0.040 inches to 0.040 inches.

10. The system of claim 1, wherein the sensing element is a piezoresistive leadless sensor.

11. The system of claim 1, wherein the sensing element is used to measure an environmental condition.

12. The system of claim 1, wherein the environmental condition is pressure.

13. The system of claim 1, wherein the adapter is disposed around and defines an opening and the sensing element is disposed in the opening.

14. The system of claim 13, wherein a shape of the opening is about equivalent to a shape of the sensing element.

15. The system of claim 14, wherein the shape of the opening is square.

16. The system of claim 13, wherein a size of the opening is about equivalent to a size of the sensing element.

17. The system of claim 13, further comprising:
a screen disposed in the opening of the adapter;
wherein a first cavity is disposed between the screen and the sensing element and a second cavity is associated with the first gap; and
wherein the screen in combination with the first cavity and the second cavity form a Helmholtz resonator.

18. The system of claim 17, wherein the Helmhotz resonator does not reduce a response time of the sensing element.

19. The system of claim 17, wherein a third cavity is associated with the second gap; and
wherein the screen in combination with the first cavity, the second cavity and the third cavity form a Helmholtz resonator.

20. The system of claim 19, wherein a response time of the sensing element is less than about fifty microseconds.

21. The system of claim 1, wherein the front surface of the adapter is coupled to a mating surface.

* * * * *